US011618086B2

(12) United States Patent
Liu

(10) Patent No.: US 11,618,086 B2
(45) Date of Patent: Apr. 4, 2023

(54) REMOVABLE INNER SHELL FOR DROSS CONTROL AND/OR REMOVAL FOR METAL PRINTER

(71) Applicant: XEROX CORPORATION, Norwalk, CT (US)

(72) Inventor: Chu-heng Liu, Penfield, NY (US)

(73) Assignee: XEROX CORPORATION, Norwalk, CT (US)

( * ) Notice: Subject to any disclaimer, the term of this patent is extended or adjusted under 35 U.S.C. 154(b) by 134 days.

(21) Appl. No.: 17/131,372

(22) Filed: Dec. 22, 2020

(65) Prior Publication Data
US 2022/0193780 A1 Jun. 23, 2022

(51) Int. Cl.
*B22F 12/52* (2021.01)
*B22F 10/22* (2021.01)
*B33Y 30/00* (2015.01)
*B33Y 10/00* (2015.01)
*B22D 23/00* (2006.01)

(52) U.S. Cl.
CPC ............ *B22F 12/52* (2021.01); *B22D 23/003* (2013.01); *B22F 10/22* (2021.01); *B33Y 10/00* (2014.12); *B33Y 30/00* (2014.12)

(58) Field of Classification Search
CPC .......... B22F 12/52; B22F 10/22; B22F 12/50; B22F 12/53; B22F 12/00; B22F 12/57; B22F 12/90; B22F 12/55; B22F 3/115; B22D 23/003; B33Y 10/00; B33Y 30/00; B33Y 40/00; Y02P 10/25
See application file for complete search history.

(56) References Cited

U.S. PATENT DOCUMENTS

| 5,386,224 A | 1/1995 | Deur et al. |
| 7,556,326 B2 | 7/2009 | Knierim et al. |
| 2015/0273577 A1* | 10/2015 | Vader ...................... B22F 12/53 164/513 |
| 2018/0269024 A1* | 9/2018 | Nguyen .................. B22F 10/25 |

OTHER PUBLICATIONS

Sukhotskiy et al., "Magnetohydrodynamic Drop-on-Demand Liquid Metal 3D Printing," Solid Freeform Fabrication 2017: Proceedings of the 28th Annual International, Solid Freeform Fabrication Symposium—An Additive Manufacturing Conference, 1806-1811.

* cited by examiner

*Primary Examiner* — Michael M. Robinson
(74) *Attorney, Agent, or Firm* — MH2 Technology Law Group LLP

(57) ABSTRACT

An implementation of the present teachings includes inner shell for a printer, such as a liquid metal printer, that mitigates problems associated with the formation of dross. The inner shell can be installed in a reservoir of the printer during a printing process where, during the printing process, a dross can form on an interior sidewall of the inner shell. Subsequently, the inner shell can be removed and either cleaned or replaced. During printing, the inner shell can be raised and/or lowered, or otherwise repositioned, so that the dross forms over a larger surface area of the inner shell, and at a decreased thickness, compared to an inner shell that is not repositioned.

15 Claims, 5 Drawing Sheets

REMOVABLE INNER SHELL FOR DROSS CONTROL AND/OR REMOVAL FOR METAL PRINTER

TECHNICAL FIELD

The present teachings relate to the field of printing, such as three dimensional printing, functional printing, and other printing and, more particularly, to methods and structures for printing high melting point temperature materials such as metals and metal alloys.

BACKGROUND

Drop-on-demand (DOD) printers that are capable of jetting or ejecting high temperature materials such as a metal are being developed and improved. One type of printer employs magnetohydrodynamics (MHD) technology to manipulate an electrically conductive print fluid or print material such as liquid metal, for example molten aluminum, using a magnetic field to eject a single drop or volume of the print material from a nozzle. During a metal printing process, metal in a solid form can be supplied from a wire spool to a supply reservoir of the printer. The solid metal is heated within the supply reservoir to a temperature sufficient to melt the solid metal and to maintain a level of liquid metal within the supply reservoir. When the level of liquid metal within the supply reservoir is sufficient, the liquid metal is passed from the supply reservoir through a channel to the nozzle, and printing can be initiated. The liquid metal that is ejected from the nozzle onto a surface is replaced so that a desired level or volume of liquid metal is maintained within the supply reservoir. Thus printing of liquid metal can be continuous.

The level of liquid metal within the supply reservoir can be monitored using, for example, a laser that emits a laser beam onto an upper surface of the liquid metal within the supply reservoir. The laser beam is reflected from the upper surface of the liquid metal, and the reflected laser beam is detected using one or more photosensors (hereinafter, collectively, "a photosensor"). The position of the reflected laser beam will vary depending on the level of the liquid metal within the reservoir. The position of the reflected laser beam on the photosensor will vary depending on the level of the liquid metal within the reservoir, and the position of the reflected laser beam on the photosensor can be used to calculate the level of the liquid metal within the reservoir. When the level of the liquid metal is sufficiently low, additional solid metal can be supplied from the wire spool and melted within the supply reservoir to maintain or increase a desired level of liquid metal within the supply reservoir.

A method and structure that allows for improved measurement of a liquid metal within a supply reservoir of a metal printer would be a welcome addition to the art.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation of the present teachings, a printer includes a block that defines, at least in part, a reservoir, a nozzle comprising an orifice, wherein the nozzle and the orifice are in fluid communication with the reservoir, an ejector configured to eject a droplet of print material from the orifice of the nozzle, and an inner shell positioned within the reservoir. The inner shell includes an interior sidewall that defines, at least in part, an inner vessel, an exterior sidewall opposite the interior sidewall, a first surface intersecting the interior sidewall and the exterior sidewall, a second surface opposite the first surface and intersecting the interior sidewall and the exterior sidewall, and a flow path configured for a flow of a print fluid from the inner vessel, to an exterior of the inner shell, and to the orifice of the nozzle.

Optionally, the inner shell is at least partially formed from graphite and/or can have a thickness, from the interior sidewall to the exterior sidewall, of from 0.05 millimeters (mm) to 2.0 mm. The inner shell can optionally further include one or more slots that extend from the interior sidewall to the exterior sidewall proximate a first end of the inner shell, wherein the inner shell is configured such that the flow path is through the one or more slots.

Optionally, the reservoir, in plan view, has a circular shape and the inner shell, in plan view, has a circular shape. Further, a dross can be positioned on the interior sidewall of the inner shell. The dross can include at least one of magnesium oxide or aluminum oxide, or both magnesium oxide and aluminum oxide. The printer can include an actuator configured to reposition the inner shell relative to a bottom of the reservoir during printing. Additionally, the reservoir can include a sidewall provided by the block that defines, at least in part, the reservoir, a first section defined by the inner vessel, and a second section defined by the exterior sidewall of the inner shell and the sidewall of the reservoir. The printer can be configured so that, during printing, print material is introduced into the reservoir through the inner vessel. The printer can include a liquid metal print material within the reservoir and within the inner vessel of the inner shell.

In another implementation, a method for forming a printed structure includes providing a print fluid within a reservoir of a printer, ejecting at least a portion of the print fluid from a nozzle of the printer, thereby decreasing a volume of the print fluid within the reservoir, removing a first replaceable inner shell from the reservoir, and reinstalling the first replaceable inner shell, or installing a second replaceable inner shell, into the reservoir of the printer.

Optionally, the method can further include repositioning the first replaceable inner shell within the reservoir during the ejecting of the at least the portion of the print fluid from the nozzle of the printer using an actuator. The method can also optionally include removing a dross from an interior wall of the first replaceable inner shell after removing the first replaceable inner shell from the reservoir, then reinstalling the first replaceable inner shell into the reservoir.

In another implementation, a printer component includes at least one interior sidewall that defines, at least in part, an inner vessel, at least one exterior sidewall opposite the at least one interior sidewall, a first surface intersecting the at least one interior sidewall and the at least one exterior sidewall, a second surface opposite the first surface and intersecting the at least one interior sidewall and the at least one exterior sidewall, and a flow path configured for a flow of a print fluid from the inner vessel to an exterior of the printer component.

Optionally, the printer component is at least partially formed from graphite and/or can have a thickness from the at least one interior sidewall to the at least one exterior sidewall, of from 0.05 mm to 2.0 mm. The printer component can further include one or more slots that extend from the at least one interior sidewall to the at least one exterior sidewall proximate a first end of the printer component, wherein the printer component is configured such that the flow path is through the one or more slots. Further optionally, the printer component, in plan view, can include a circular shape, only one interior sidewall, and only one exterior sidewall. The printer component can include a dross positioned on the at least one interior sidewall, and the dross can include at least one of magnesium oxide or aluminum oxide, or both magnesium oxide and aluminum oxide.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
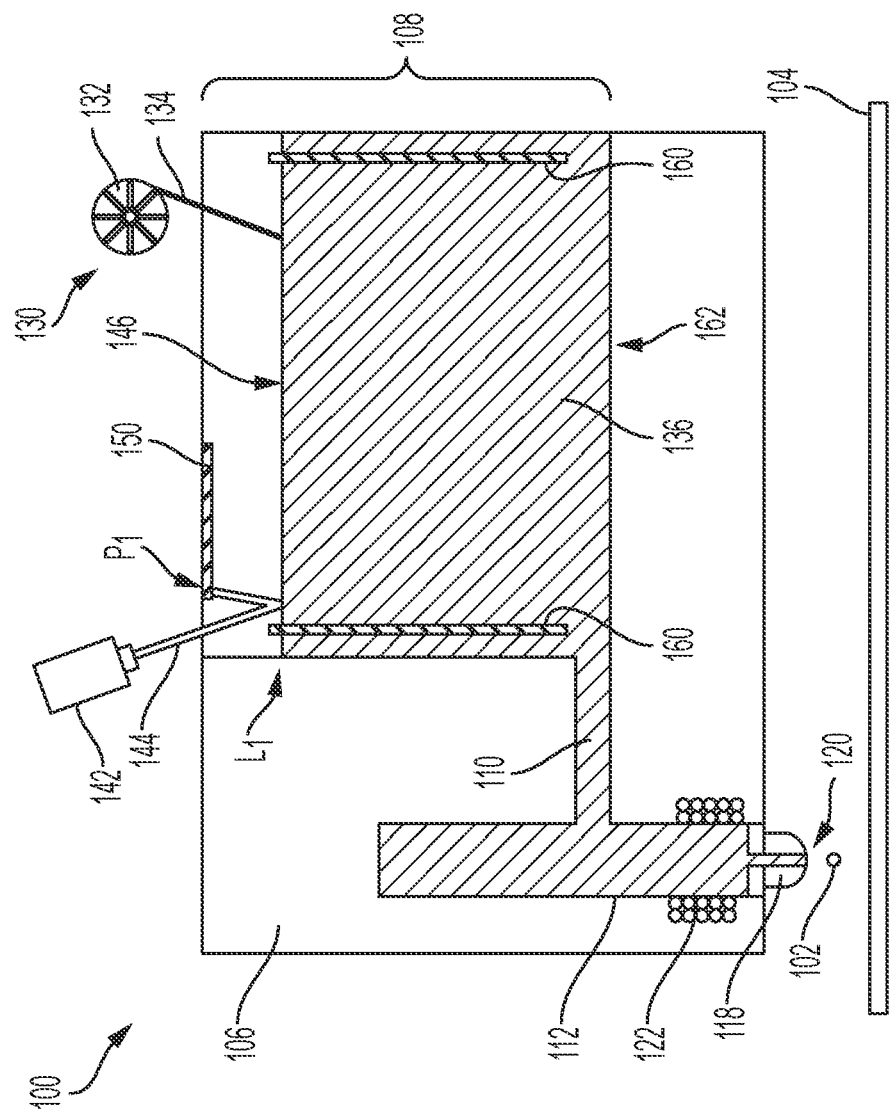
FIG. 1 is a schematic cross section of a printer including an inner shell within a reservoir of the printer according to an implementation of the present teachings.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts.

As used herein, unless otherwise specified, the word "printer" encompasses any apparatus that performs a print outputting function for any purpose.

As discussed above, the level of liquid print material in a reservoir of a printer, for example liquid metal in a metal printer, can be monitored using a laser that directs a laser beam onto an upper surface of the liquid metal and a photosensor that detects a position of the laser beam that is reflected from the upper surface of the metal onto the photosensor. As the level of the liquid metal decreases and increases, the position of the reflected laser beam on the photosensor changes, and the position can be used to calculate the level of the liquid metal within the reservoir.

One impediment that can interfere with the accurate measurement of the level of liquid metal within the reservoir is the formation of dross on the upper surface of the liquid metal. Dross can be, for example, impurities, contaminants, chemical by-products, or another material that can be introduced from contamination on or within the metal supply. Further, the dross may form from a chemical reaction of two or more reactants within the reservoir of the printer. The dross can be or include, for example, a solid or mostly solid material. The dross can be or include, for example, magnesium oxide (MgO), aluminum oxide (Al2O3), another material that forms on at least a portion of the upper surface of liquid print material within the reservoir, or combinations thereof. The dross is generally less dense (i.e., lighter) than the liquid print material and thus floats on an upper surface of the liquid print material. One major source of the dross is the supply metal stock. The more material that has run through the system, the more dross can potentially accumulate. In other words, the amount of dross that accumulates within the printer is directly proportional to the amount of print material that has been melted within the reservoir.

The dross can build up and accumulate within the reservoir, particularly on the walls that form the reservoir and across the upper surface of the liquid print material, and can interfere with the ability of the print system to determine the height of the liquid pool within the reservoir. While the level of the liquid print material drops during printing, the position and level of the dross remains fixed within the reservoir. If laser beam reflects from the dross rather than the liquid print material, the position of the laser beam on the photoreceptor does not change with the changing level of the print material. Thus the position of the laser beam on the photoreceptor indicates the fixed position of the dross and not the changing level of the print material. The printer can, for example, stop feeding solid wire into the print reservoir because the position of the reflected laser beam incorrectly indicates that the reservoir is full while, in fact, the level of the liquid metal is dropping. As the printer reservoir empties, liquid metal is no longer available or ejected from the nozzle and printing ceases.

An implementation of the present teachings includes a printer component that helps mitigate dross buildup and the problems associated therewith, as discussed below.

FIG. 1 is a schematic cross section of a printer 100 such as a metal printer that uses magnetohydrodynamic (MHD) technology to eject droplets 102 such as metal droplets onto a surface 104. Use of various aspects and structures according to the present teachings with other ejection technologies is contemplated. Further, it will be appreciated that the figures depict generalized example schematic illustrations, and an actual printer in accordance with the present teachings can include other structures that are not depicted for simplicity, while various depicted structures can be removed or modified.

The printer 100 of FIG. 1 includes a block 106 that defines a reservoir 108, a supply inlet 110, and an ejection chamber 112. While the block 106 is depicted as a single structure, it will be appreciated that the block 106 can include two or more sections that are attached together. The block 106 can be or include, for example, boron nitride, graphite, or another material that resists physical changes and damage from high temperatures encountered during use. The printer 100 further includes a nozzle 118, such as a replaceable nozzle 118. The nozzle 118 includes an orifice 120 from which the metal droplets 102 are ejected during printing. The printer 100 further includes an ejector 122 that is engaged to eject the metal droplet 102 from the nozzle 118. The ejector 122 can be, for example, an electromagnetic coil 122 that encircles the ejection chamber 112, or another type of ejector 122.

FIG. 1 further depicts a metal supply 130 which, in this implementation, is a reel 132 that supplies a metal wire 134 in solid form to the reservoir 108. The metal wire 134 is heated and melted within the reservoir 108 and becomes a liquid metal 136. The liquid metal 136 flows from the reservoir 108, through the supply inlet 110, into the ejection chamber 112, to the nozzle 118, and is ejected from the orifice 120 using the ejector 122. Printers including other flow paths for the liquid metal 136 are contemplated.

To eject a metal droplet 102 from the orifice 120 of the nozzle 118, a current is applied to the coil 122 which develops and creates a pulsed magnetic field through the coil 122. This pulsed magnetic field induces an MHD-based force density within the liquid metal 136 within the ejection chamber 112, which overcomes capillarity and/or surface tension of the liquid metal 136 within the nozzle 118, thereby ejecting the metal droplet 102 from the orifice 120 of the nozzle 118. It will be appreciated that contours of the supply inlet 110 and/or the ejection chamber 112 can be designed to improve, customize, and/or optimize flow dynamics of the liquid metal 136 therewithin.

As liquid metal 136 is ejected from the nozzle 118 in the form of the metal droplet 102, a level "L" of the liquid metal 136 within the reservoir 108 is monitored using, for example, a laser 142 that emits a laser beam 144 onto an upper surface (i.e., top surface) 146 of the liquid metal 136. The laser beam 144 reflects from the upper surface 146 of the liquid metal 136 and onto a photosensor 150. When the upper surface 146 of the liquid metal 136 is at level $L_1$, the laser beam 144 is reflected onto position $P_1$ of the photosensor 150.

Figure 2:
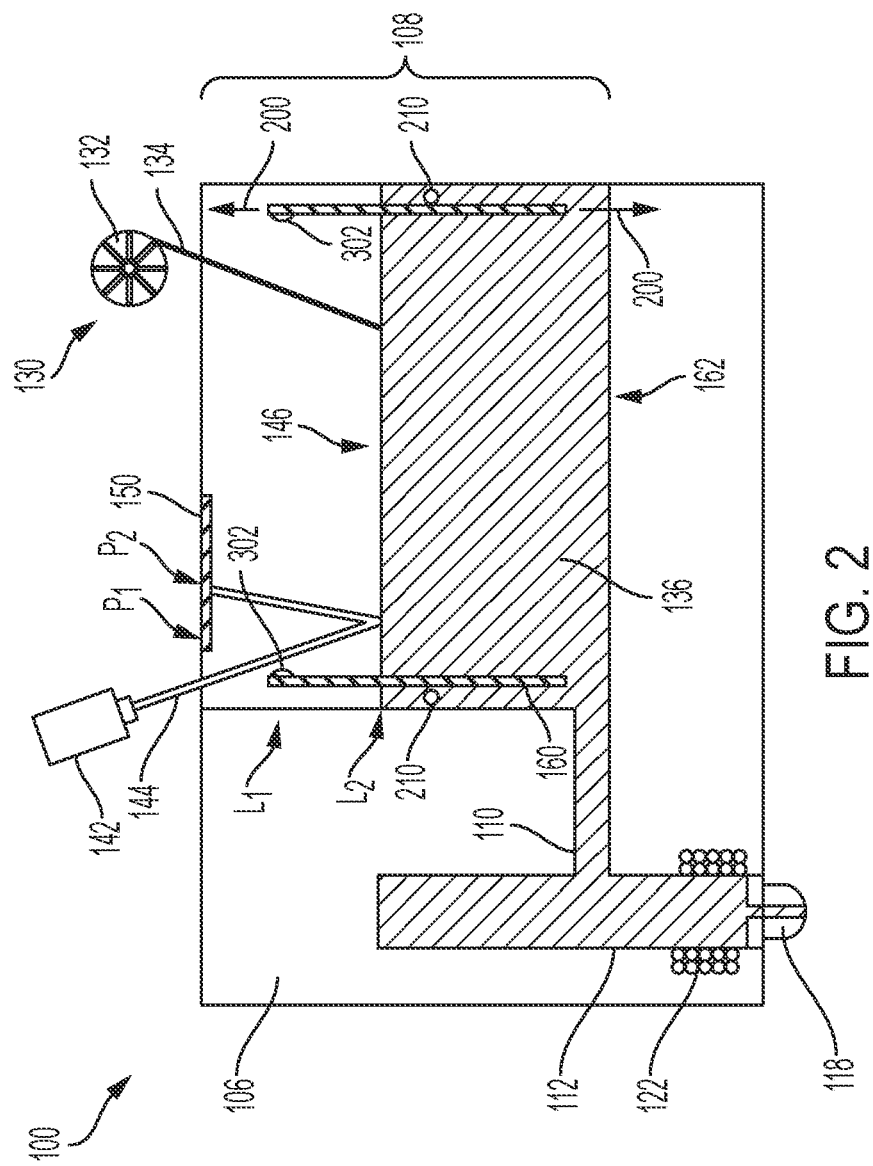
FIG. 2 depicts the printer of FIG. 1 during a printing process, where a level of liquid print fluid has decreased compared to the state of FIG. 1.

As depicted in FIG. 2, as the level of the liquid metal 136 decreases during printing, the position of the reflected laser beam 144 on the photosensor 150 changes. For example, when the upper surface 146 of the liquid metal 136 drops from level $L_1$ to level $L_2$, the laser beam 144 reflects from the upper surface 146 of the liquid metal 136 onto position $P_2$ of the photosensor 150.

Figure 3:
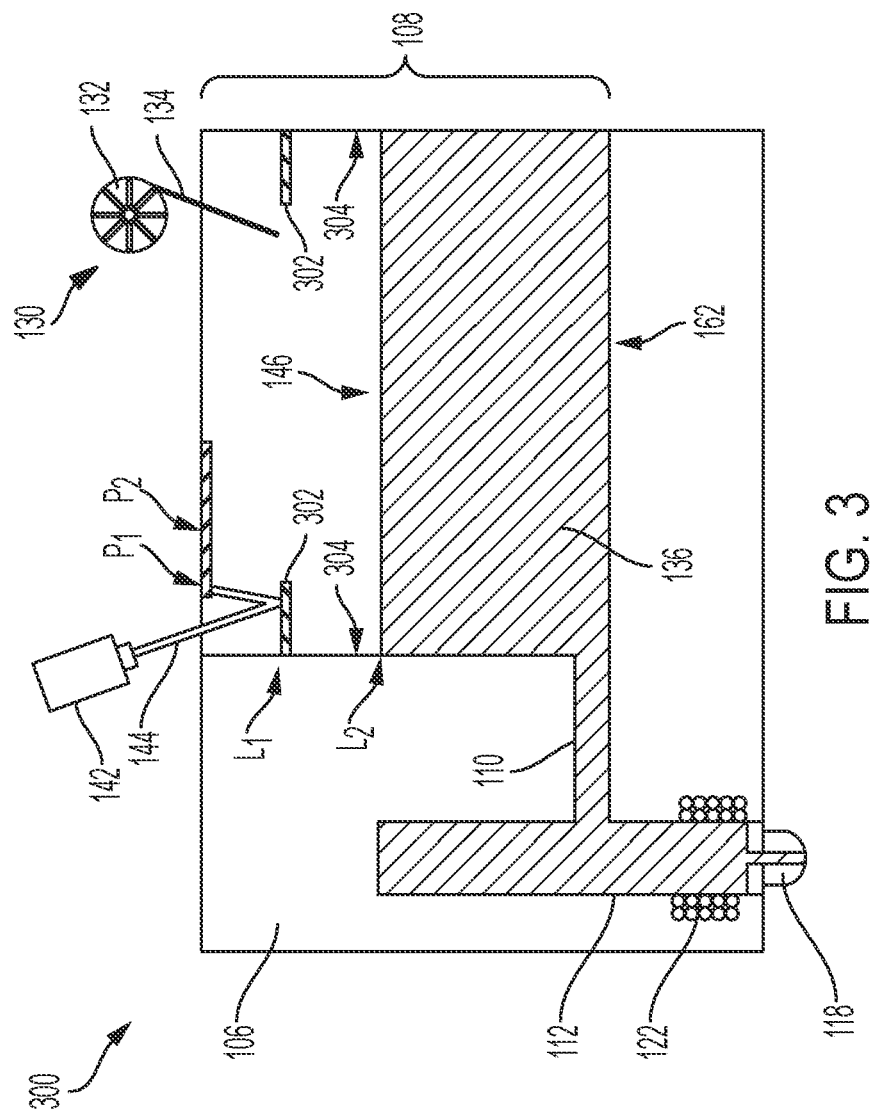
FIG. 3 is a schematic cross section depicting a dross formed on a sidewall of the reservoir of the printer, which can result in inaccurate monitoring of the level of the liquid print fluid within the reservoir.

FIG. 3 depicts a printer 300 within which dross 302 has built up on sidewall(s) 304 of the block 106 within the reservoir 108. (It will be appreciated that a reservoir 108 having a circular or oval perimeter includes one continuous sidewall, while a reservoir 108 having a square or rectangular perimeter includes four connected sidewalls.) As depicted, the liquid metal 136 has dropped during printing from level $L_1$ to level $L_2$, and the laser beam 144 reflects from the dross 302 rather than from the upper surface 146 of the liquid metal 136. As such, the printer 300 has not detected that the level of the liquid metal 136 has dropped and the liquid metal 136 requires replenishment. In the structure of FIG. 3, the liquid metal 136 will eventually be depleted and printing will cease.

Referring back to FIG. 1, the printer 100 according to an implementation of the present teachings includes an inner shell 160 (i.e., an inner sleeve or liner). The inner shell 160 can be a substructure of the printer that can be replaced by the user, for example, between printing sessions and/or during routine maintenance.

The inner shell 160 can be or include graphite, ceramic, or a metal (e.g., tungsten) or a metal alloy that has a higher melting point than the metal used as the print material. The dimensions and shape of the inner shell 160 may depend, at least in part, on the dimensions and shape of the reservoir 108 formed by the block 106 of the printer 100. For example, in plan view, the reservoir 108 may have a generally circular shape; thus, as depicted at 400 of FIG. 4, which depicts a plan view of the inner shell 160, the inner shell 160 may also have a generally circular shape. In other implementations, the reservoir 108 may have a generally square or rectangular shape, or another shape, and thus the inner shell 160 can have a generally square or rectangular shape, or another shape, respectively (not individually depicted for simplicity). In some implementations, the inner shell 160 may physically contact the sidewalls 304 and/or a bottom 162 that define, at least in part, the reservoir 108. In another implementation, the inner shell 160 may be free from contact with the sidewalls 304 that define the reservoir 108 but may physically contact the bottom 162. In some implementations as described below, the inner shell 160 may physically contact the bottom 162 during a period of use, and be free from contact with the bottom during other periods of use.

Figure 4:
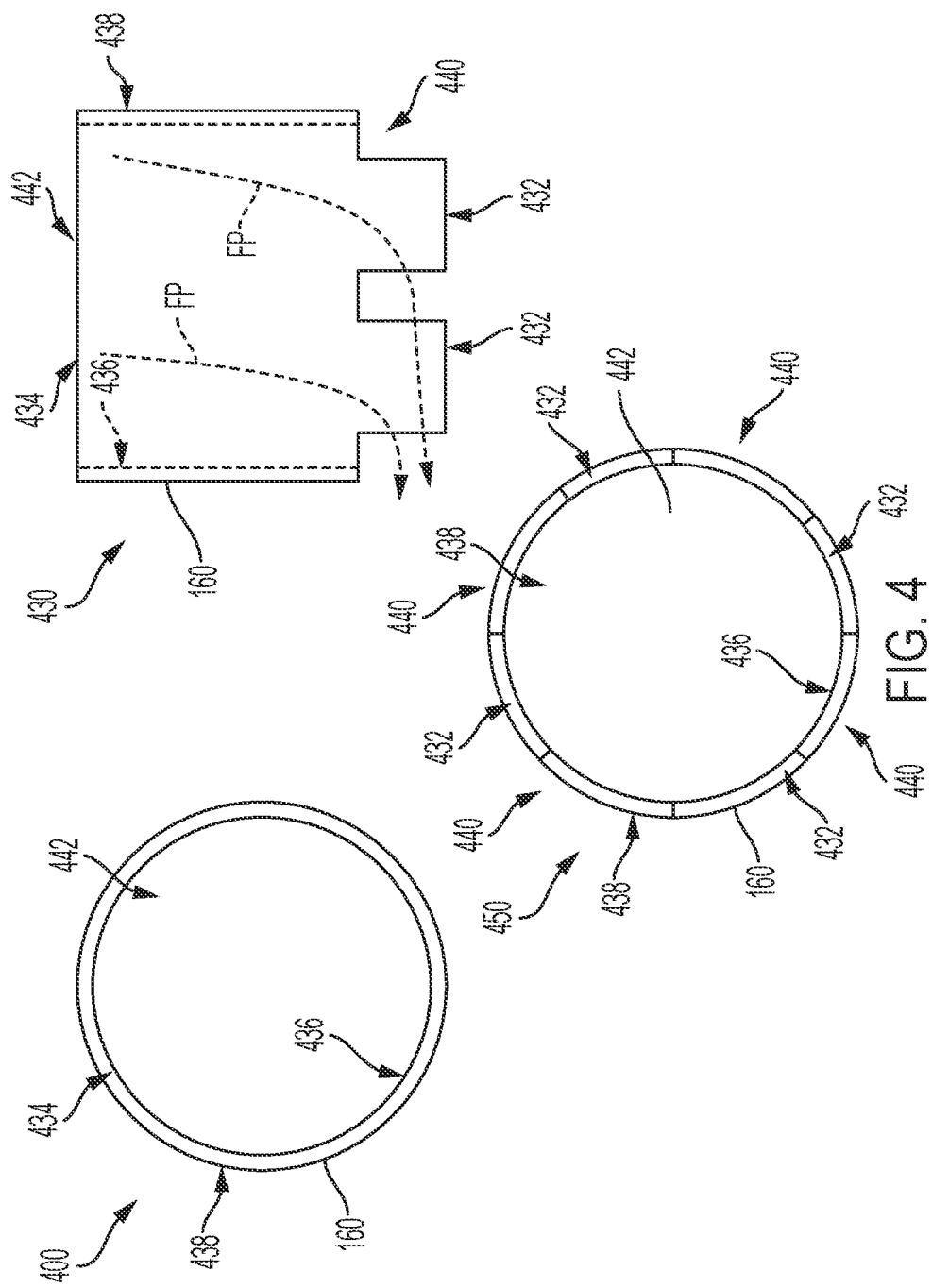
FIG. 4 depicts a top view, a side view, and a bottom view of an inner shell according to an implementation of the present teachings.

FIG. 4 depicts the plan view 400, and further depicts a side view 430 and a bottom view 450, of an implementation of the inner shell 160. In this implementation, the inner shell 160 includes a first, lower surface 432 at a first end of the inner shell 160 and a second, upper surface 434 opposite the lower surface 432 at a second end of the inner shell 160 where the second end is opposite the first end. The inner shell 160 further includes one or more interior sidewall(s) 436 and one or more exterior sidewall(s) 438 opposite the interior sidewall(s) 436. (It will be appreciated that an inner shell 160 having a circular or oval perimeter includes only one continuous interior sidewall 436 and only one continuous exterior sidewall 438, while an inner shell 160 having a square or rectangular perimeter includes four connected interior sidewalls 436 and four connected exterior sidewalls 438.) The lower surface 432 intersects the interior sidewall 436 and the exterior sidewall 438 at the first end of the inner shell 160. The upper surface 434 intersects the interior sidewall 436 and the exterior sidewall 438 at the second end of the inner shell 160. The inner shell 160 further defines one or more notches or slots 440 that extend through the inner shell 160 from the interior sidewall 436 to the exterior sidewall 438 proximate the first end of the inner shell 160. The slots 440 allow liquid metal 136 to flow from an inner vessel 442 that is defined, at least in part, by the interior sidewall 436 of the inner shell 160 to an exterior of the inner shell 160 and into the inlet 110. Various flow paths "FP" of the liquid metal 136 from the inner vessel 442, through the one or more slots 440, to the exterior the inner shell, and then to the inlet 110 are depicted in the side view 430.

The inner shell 160 can be either a single-piece structure or a multi-piece structure. Multi-piece implementations can include two or more structures that are either separate (e.g., physically spaced) or physically connected together. The inner shell 160 can have a thickness, from the interior sidewall 436 to the exterior sidewall 438, of from about 0.05 millimeters (mm) to about 5.0 mm, or from about 0.5 to about 3.0 mm.

During printing, the inner shell 160 can be maintained in a fixed position during the entire printing process. In this implementation, referring back to FIG. 2, dross 302 is deposited at generally a fixed location (i.e., at a fixed height) on the inner shell 160 during the printing session. However, during a maintenance or repair procedure between printing sessions, the reservoir 108 of the printer 100 is accessed and the inner shell 160 is removed and replaced. Because the contaminated inner shell 160 is replaced before a large deposit of dross 302 is allowed to form, the problem represented in FIG. 3 is avoided. In some cases, the interval for removal and/or replacement of the inner shell 160 is not sufficient for one work shift and some job printing may be interrupted.

In another implementation of the present teachings, the position of the inner shell 160 can be changed and/or adjusted during a printing session. For example, the inner shell can be repositioned 200, e.g., raised, lowered, or otherwise repositioned 200, relative to the bottom 162 of the reservoir 108 as depicted in FIG. 2, during the printing process so that only a thin coating of dross 302 forms on the interior sidewall 436 of the inner shell 160. In other words, the same volume of dross 302 forms on the surface of the inner shell 160, but the dross 302 forms over a larger surface area of the inner shell 160 due to the repositioning of the inner shell 160 in the vertical direction during the printing process. Repositioning of the inner shell 160 can be performed using an actuator 210 such as a mechanical actuator 210 or an electromechanical actuator 210 that, at least in part, physically contacts and/or is physically connected to the inner shell 160. For example, the actuator 210 can include the use of one or more rotating wheels 210 that, in conjunction with an electric motor (not depicted in FIG. 2 for simplicity), is configured to raise and/or lower, and/or otherwise reposition, the inner shell 160 relative to the bottom 162 of the reservoir 108 during printing.

One major source of the dross 302 is the supply metal stock (e.g., the metal wire 134). The more material (e.g., supply metal stock) that has run through the system, the more dross 302 that can potentially accumulate. Therefore, the amount of dross 302 is generally proportional to the amount of metal (e.g., the metal wire 134) that is fed through the printer 100. Since the dross 302 floats to the upper surface 146 of the liquid metal 136, the dross 302 is mostly above the liquid metal 136 and is contained by the sidewalls 304 that enclose the supply metal stock. In a conventional printer 300 without the inner shell 160, the dross 302 can attached to, and accumulate on, the sidewalls 304 and can permanently bond to the sidewalls 304, which requires replacement of the entire printhead for further operation of the printer. In a printer 100 using the inner shell 160, the dross attaches to, and accumulates on, the interior sidewall (s) 436 of the inner shell 160, which can be easily cleaned and/or replaced.

In an aspect of the present teachings, the inner shell 160 divides the reservoir 108 into two sections. A first section of the reservoir 108 is provided by the inner vessel 442 and is defined, at least in part, by the interior sidewall 436 of the inner shell 160. A second section of the reservoir 108 is provided between the exterior sidewall(s) 438 of the inner shell 160 and the sidewall(s) 304 of the block 106 that define, at least in part, the reservoir 108.

During use of the printer 100, as depicted in FIG. 1, the metal supply 130, e.g., the metal wire 134, is fed into the reservoir 108 within the first section of the reservoir 108. In other words, the metal wire 134 is introduced into the reservoir 108 within and through the inner vessel 442 and between opposite portions of the interior sidewall 436 of the inner shell 160. Introducing the solid metal wire 134 into the reservoir 108 within the inner vessel 442 of the inner shell 160 ensures that the dross 302, which is less dense than the liquid metal 136, is contained within the inner vessel 442 as long as the upper surface 146 of the liquid metal 136 remains below the upper surface 434 of the inner shell 160. The printer 100 including the inner shell 160 are thus designed so that the upper surface 146 of the liquid metal 136, at its highest point, remains below the upper surface 434 of the inner shell 160. This ensures that any buildup of dross 302 occurs on the interior sidewall(s) 436 of the inner shell 160 and not on the sidewalls 304 that define the reservoir 108. The dross 302 can thus be removed by replacing the inner shell 160, or by removing the dross 302 from the inner shell 160, during repair or maintenance of the printer 100.

The second section of the reservoir 108 between the exterior sidewall(s) 438 of the inner shell 160 and the sidewall(s) 304 of the reservoir 108 has minimal buildup of dross 302. Some dross 302 may be introduced into this section, for example, during an initial fill of the reservoir 108 with the metal wire 134. During replenishment of liquid metal 136 that has been printed as metal droplets 102, added dross 302 is contained within the inner vessel 442.

During printing, the majority of liquid metal 136 provided to the nozzle 118 originates from the first section of the reservoir 108 (i.e., from the inner vessel 442) rather than from the second section of the reservoir 108 (i.e., from between the exterior sidewall 438 of the inner shell 160 and the sidewall 304 of the block 106 that define, at least in part, the reservoir 108). This occurs, in part, because the large majority of the volume of liquid metal 136 that is supplied to the nozzle 118 originates within the first section of the reservoir 108. The volume of liquid metal 136 within the second section of the reservoir 108 is mostly stagnant, and only a very small volume of the liquid metal 136 is supplied to the nozzle 118 from the second section.

Figure 5:
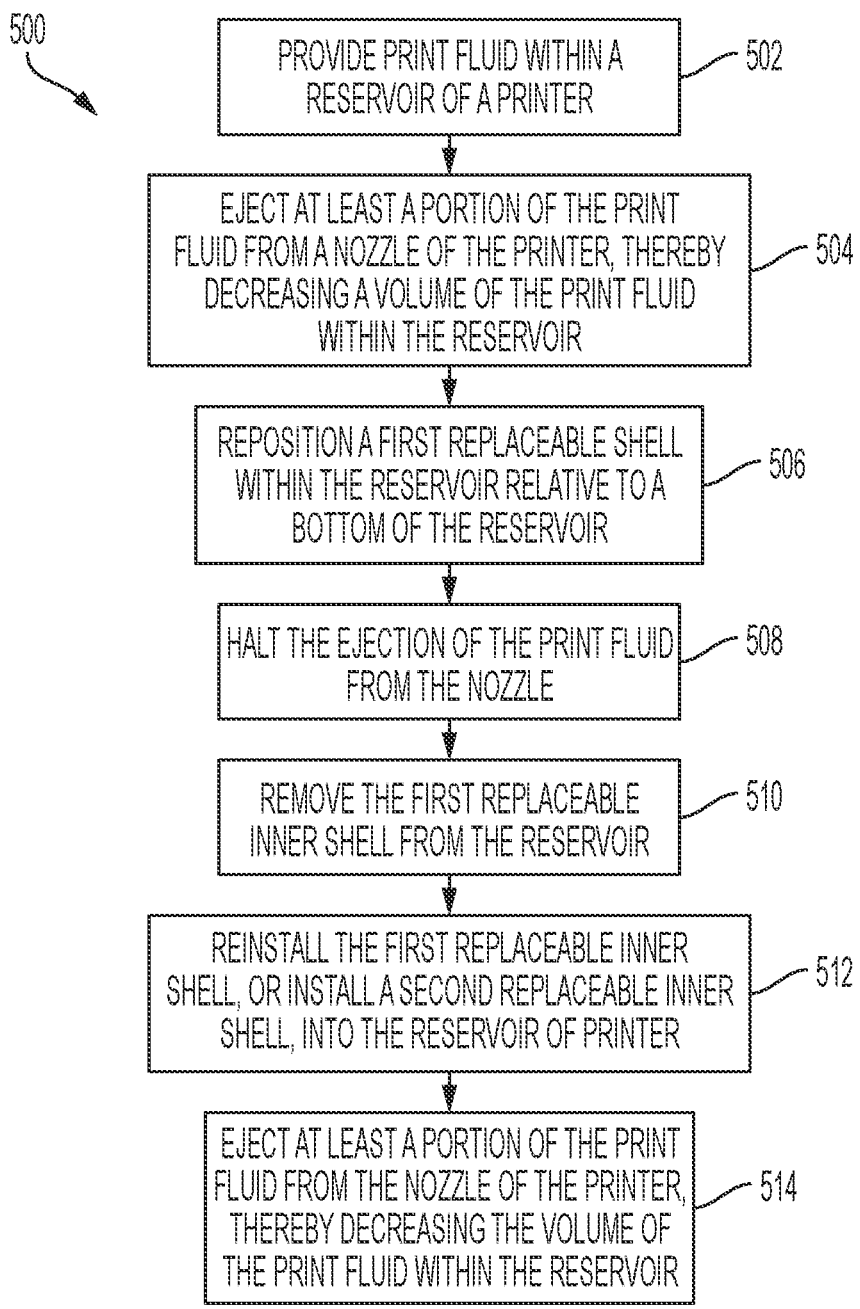
FIG. 5 depicts a method for forming a printed structure according to an implementation of the present teachings.

FIG. 5 depicts a method 500 that can be used to form a printed structure. For simplicity of explanation, and without limiting the present teachings, the method 500 of FIG. 5 is described with reference to the structures depicted in FIGS. 1, 2, and 4, although it is contemplated other implementations can include structures and method acts that are not depicted for simplicity, while various depicted structures and method acts may be removed or modified.

The method 500 can including providing a print fluid 136, such as a liquid metal 136, within a reservoir 108 of a printer 100 as at 502. This can include, for example, melting a metal wire 134 supplied from a reel 132 within the reservoir 108, or another subprocess. The reservoir 108 can be defined by, or provided by, a block 106 of the printer 100. At 504, the print fluid 136 is ejected from a nozzle 118 of the printer 100, thereby decreasing a volume of the print fluid 136 within the reservoir 108. For example, the volume of the print fluid 136 can decrease from a first level $L_1$ to a second level $L_2$.

In an optional implementation, during the printing, a first replaceable shell 160 can be raised, lowered, and/or otherwise repositioned 200 relative to a bottom 162 of the reservoir 108 as at 506.

After printing has been completed or at some other processing stage, the ejection of the print fluid 136 from the nozzle 118 is halted as at 508. The first replaceable inner shell 160 is removed from the reservoir 108 as at 510. This may require partial disassembly of the printer 100 during, for example, a maintenance or repair process. The first replaceable inner shell 160 can be cleaned, reconditioned, or otherwise processed to partially or completely remove dross 302 that has collected on the first inner shell 160, then reinstalled into the printer 100 as at 512. In an alternative to removing the dross 302, the first replaceable inner shell 160 can be discarded or recycled, and a second replaceable inner shell 160 can be installed into the printer 100 as at 512. Subsequently, the printer 100 can be reassembled. After reassembling the printer, printing can continue, for example, by ejecting at least a portion of the print fluid 136 from the nozzle 118 of the printer 100 as at 514.

An implementation of the present teachings thus mitigates problems associated with the formation of dross 302 within the printer 100. The inner shell 160 is positioned within the printer 100 such that the dross 302 forms on the removable inner shell 160 rather than on other parts of the printer 100. The inner shell 160 can then be removed for cleaning, reconditioning, or replacement. Because the dross 302 is removed from the printer 100 before excessive buildup occurs, various problems such as incorrect measurement of the print fluid 136 within the reservoir 108 as depicted in FIG. 3 can be avoided.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g., −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A printer, comprising:
    a block that defines, at least in part, a reservoir;
    a nozzle comprising an orifice, wherein the nozzle and the orifice are in fluid communication with the reservoir;
    an ejector configured to eject a droplet of print material from the orifice of the nozzle; and
    an inner shell positioned within the reservoir, the inner shell comprising:
        an interior sidewall that defines, at least in part, an inner vessel;
        an exterior sidewall opposite the interior sidewall;
        a first surface intersecting the interior sidewall and the exterior sidewall;
        a second surface opposite the first surface and intersecting the interior sidewall and the exterior sidewall; and
        a flow path configured for a flow of a print fluid from the inner vessel, to an exterior of the inner shell, and to the orifice of the nozzle;
        wherein the inner shell further comprises one or more slots that extend from the interior sidewall to the exterior sidewall proximate a first end of the inner shell, wherein the inner shell is configured such that the flow path is through the one or more slots.

2. The printer of claim 1, wherein the inner shell is at least partially formed from graphite.

3. The printer of claim 1, wherein the inner shell has a thickness, from the interior sidewall to the exterior sidewall, of from 0.05 millimeters (mm) to 2.0 mm.

4. The printer of claim 1, wherein:
    the reservoir, in plan view, comprises a circular shape; and
    the inner shell, in plan view, comprises a circular shape.

5. The printer of claim 1, wherein the inner shell is configured to be removed when dross is formed on the interior sidewall of the inner shell.

6. The printer of claim 5, wherein the dross comprises at least one of magnesium oxide or aluminum oxide, or both magnesium oxide and aluminum oxide.

7. The printer of claim 1, further comprising an actuator configured to reposition the inner shell relative to a bottom of the reservoir during printing.

8. The printer of claim 1, wherein:
    the reservoir comprises a sidewall provided by the block;
    the sidewall defines, at least in part, the reservoir;
    the reservoir comprises a first section defined by the inner vessel and a second section defined by the exterior sidewall of the inner shell and the sidewall of the reservoir; and the printer is configured so that, during printing, print material is introduced into the reservoir through the inner vessel.

9. The printer of claim 1, further comprising a liquid metal print material within the reservoir and within the inner vessel of the inner shell.

10. A printer component, comprising:
   at least one interior sidewall that defines, at least in part, an inner vessel;
   at least one exterior sidewall opposite the at least one interior sidewall;
   a first surface intersecting the at least one interior sidewall and the at least one exterior sidewall;
   a second surface opposite the first surface and intersecting the at least one interior sidewall and the at least one exterior sidewall;
   a flow path configured for a flow of a print fluid from the inner vessel to an exterior of the printer component; and
   one or more slots that extend from the at least one interior sidewall to the at least one exterior sidewall proximate a first end of the printer component, wherein the printer component is configured such that the flow path is through the one or more slots.

11. The printer component of claim 10, wherein the printer component is at least partially formed from graphite.

12. The printer component of claim 10, having a thickness from the at least one interior sidewall to the at least one exterior sidewall, of from 0.05 millimeters (mm) to 2.0 mm.

13. The printer component of claim 10, wherein the printer component, in plan view, comprises a circular shape and comprises only one interior sidewall and only one exterior sidewall.

14. The printer component of claim 10, wherein the inner vessel is configured to be removed when dross is formed on the at least one interior sidewall.

15. The printer component of claim 14, wherein the dross comprises at least one of magnesium oxide or aluminum oxide, or both magnesium oxide and aluminum oxide.

* * * * *